(12) United States Patent
Stenneth

(10) Patent No.: US 10,754,062 B2
(45) Date of Patent: Aug. 25, 2020

(54) SELECTING A WEATHER ESTIMATION ALGORITHM AND PROVIDING A WEATHER ESTIMATE

(71) Applicant: HERE Global B.V., Eindhoven (NL)

(72) Inventor: Leon Oliver Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 359 days.

(21) Appl. No.: 15/077,507

(22) Filed: Mar. 22, 2016

(65) Prior Publication Data

US 2017/0276834 A1  Sep. 28, 2017

(51) Int. Cl.
G01W 1/00 (2006.01)
G01W 1/10 (2006.01)

(52) U.S. Cl.
CPC .......... *G01W 1/10* (2013.01); *G01W 2203/00* (2013.01); *Y02A 90/14* (2018.01)

(58) Field of Classification Search
CPC . G01W 1/10; G06F 17/5009; H04N 5/23293; H04N 7/185; B64D 43/00; B64D 47/08; G01S 13/95; G06Q 10/06315; G06Q 50/10; G06Q 30/04; G06Q 30/0283
USPC ...... 703/6; 705/7.25, 14.5, 14.66, 27.2, 301; 702/3; 701/14
See application file for complete search history.

(56) References Cited

U.S. PATENT DOCUMENTS

| | | | |
|---|---|---|---|
| 6,240,369 B1 | 5/2001 | Foust | |
| 7,275,089 B1 | 9/2007 | Marshall et al. | |
| 7,406,382 B2 | 7/2008 | Brulle-Drews | |
| 8,060,308 B2 | 11/2011 | Breed | |
| 8,314,730 B1 | 11/2012 | Musiak et al. | |
| 8,332,084 B1 | 12/2012 | Bailey et al. | |
| 8,607,154 B2 | 12/2013 | Watts et al. | |
| 8,782,041 B1 | 7/2014 | Daniel | |
| 9,030,499 B2 | 5/2015 | Börger et al. | |
| 2005/0192724 A1 | 9/2005 | Hendry | |

(Continued)

FOREIGN PATENT DOCUMENTS

WO   WO 2003/000513 A1   1/2003

OTHER PUBLICATIONS

Daly, et al., "Physiographically sensitive mapping of climatological temperature and precipitation across the conterminous United States", International Journal of Climatology, 2008.

(Continued)

*Primary Examiner* — Mouloucoulaye Inoussa
(74) *Attorney, Agent, or Firm* — Alston & Bird LLP

(57) ABSTRACT

Methods, apparatus, systems, and computer program products are provided for selecting a weather estimation algorithm and providing a weather estimate based thereon. In an example embodiment a method is provided that comprises receiving request location information by a processor, identifying one or more weather stations, and determining a distance from at least one of the one or more weather stations to a physical location indicated by the request location information. Based at least in part on the at least one determined distance, a weather estimation algorithm is selected. A weather estimation is determined for the physical location indicated by the request location information based at least on the selected weather estimation algorithm.

19 Claims, 10 Drawing Sheets

(56) References Cited

U.S. PATENT DOCUMENTS

| | | | |
|---|---|---|---|
| 2006/0178140 A1* | 8/2006 | Smith | H04M 3/42348 455/427 |
| 2008/0168339 A1 | 7/2008 | Hudson et al. | |
| 2012/0158207 A1 | 6/2012 | MacNeille et al. | |
| 2013/0014046 A1* | 1/2013 | Watts | G01W 1/00 715/772 |
| 2014/0358441 A1 | 12/2014 | Hale et al. | |
| 2015/0233772 A1 | 8/2015 | Atkinson et al. | |
| 2015/0253458 A1 | 9/2015 | Purnhagen et al. | |
| 2015/0283879 A1 | 10/2015 | Tjandra | |
| 2015/0317588 A1* | 11/2015 | D'amelia | G06Q 10/06315 705/7.25 |
| 2016/0032615 A1* | 2/2016 | Koyanna | E05B 1/0015 16/412 |
| 2016/0092615 A1* | 3/2016 | Stenneth | G01W 1/00 703/6 |
| 2016/0266249 A1 | 9/2016 | Kauffman et al. | |

OTHER PUBLICATIONS

Hanigan, I., et al., "A Comparison of Methods for Calculating Population Exposure Estimates of Daily Weather for Health Research Help with Weather History Reports", International Journal of Health Geographics, Sep. 13, 2006, 16 pages, retrieved from <http://weathersource.com/help-with-the-weather-history-reports> on Dec. 13, 2016.

Pythonforbeginners, "Scraping Wunderground", Sep. 26, 2013. Retrieved from the Internet <URLhttp://www.pythonforbeginners.com/scraping/scraping-wunderground> [retrieved on Sep. 21, 2016 2:02:44 PM].

"Weather & Climate Technologies for Business—Data | Analytics | Solutions," Weather Source—Weather & Climate Technologies for Business. [Retrieved From the Internet Sep. 30, 2019] <http://weathersource.com/help-with-the-weather-history-reports>.

* cited by examiner

SELECTING A WEATHER ESTIMATION ALGORITHM AND PROVIDING A WEATHER ESTIMATE

TECHNOLOGICAL FIELD

Example embodiments relate generally to providing a weather estimate. In particular, example embodiments generally relate to selecting a weather estimation algorithm to be used to provide a weather estimate.

BACKGROUND

For various reasons, a user may like to know past, current, and/or future predicted weather conditions for a particular location. For example, a user may be driving through and/or planning to drive through or visit an area and want to know what the current or future predicted weather conditions for the area are. In another example, information regarding past weather conditions for a particular location may be desired for completing an accident reconstruction. However, weather stations may be sparsely spaced such that no weather station is located directly in the area the user is interested in. Therefore, providing current and/or future predicted weather conditions for the area the user is interested and may be difficult.

BRIEF SUMMARY

Methods, apparatus, systems and computer program products are provided in accordance with an example embodiment in order to select a weather estimation algorithm for providing a weather estimate. In example embodiments, requested location information is received, for example, by a processor. One or more weather stations are identified and a distance from at least one of the one or more weather stations to a physical location indicated by the request location information is determined. Based at least in part on the at least one determined distance, a weather estimation algorithm is selected. A weather estimation for the physical location indicated by the request location information is determined based at least one the selected weather estimation algorithm.

In accordance with an example embodiment, a method is provided. The method comprises receiving request location information by a processor, identifying one or more weather stations, and determining a distance from at least one of the one or more weather stations to a physical location indicated by the request location information. Based at least in part on the at least one determined distance, a weather estimation algorithm is selected. A weather estimation is determined for the physical location indicated by the request location information based at least one the weather estimation algorithm.

In an example embodiment, the method further comprises providing the weather estimation to a user device, wherein the user device provided the location information. At least a portion of the weather estimation is configured to be displayed by a user interface of the user device.

In an example embodiment, when the at least one determined distance indicates that a first weather station is within a first distance threshold of the physical location indicated by the requested location information, determining the weather estimation comprises: identifying a most recent weather report provided by the first weather station, and assigning a value to one or more weather parameters of the weather estimation based on the most recent weather report. In an example embodiment when the at least one determined distance indicates that a first weather station is not within a first distance threshold of the physical location indicated by the location information, and when the at least one determined distance indicates that one or more second weather stations are within a second distance threshold of the physical location indicated by the location information, the second distance threshold being greater than the first distance threshold, determining the weather estimation comprises: identifying one or more most recent weather reports, wherein each of the one or more most recent weather reports was provided by one of the one or more second weather stations, and assigning a value to one or more weather parameters of the weather estimation based on an average of corresponding weather parameters from the one or more most recent weather reports. In an example embodiment, when the at least one determined distance indicates that a weather station is not within a first distance threshold of the physical location indicated by the location information, when the at least one determined distance indicates that a weather station is not within a second distance threshold of the physical location indicated by the location information, the second distance threshold being greater than the first distance threshold, and when the at least one determined distance indicates that one or more third weather stations are within a third distance threshold of the physical location indicated by the location information, the third distance threshold being greater than the second distance threshold, determining the weather estimation comprises: identifying one or more most recent weather reports, wherein each of the one or more most recent weather reports was provided by one of the one or more third weather stations, and assigning a value to one or more weather parameters of the weather estimation based on a weighted average of corresponding weather parameters from the one or more most recent weather reports. In some embodiments, the weights used to compute the weighted average are based at least in part on a distance from the third weather station to the physical location, a time since the weather report was issued, or both. In some embodiments, the weights used to compute the weighted average for a first weather parameter of the one or more weather parameters is based at least in part on the first weather parameter.

In example embodiments, the method further comprises identifying one or more most recent weather reports, wherein each of the one or more most recent weather reports was provided by one of the one or more weather stations; determining if a value assigned to a weather parameter of one of the one or more most recent weather reports is an outlier; and when it is determined that a particular value assigned to a particular weather parameter is an outlier, not using the corresponding most recent weather report when assigning a value for the particular weather parameter. In example embodiments, the request location information corresponds to a section of a predetermined web, the predetermined web comprising a plurality of sections, and the method further comprises identifying at least one section in which it is expected that significant weather is being experienced based at least in part on one or more weather parameters of the weather estimation. In some embodiments, identifying at least one section in which it is expected that significant weather is being experienced comprises: determining if a particular weather parameter or a combined parameter determined based on two or more weather parameters is greater than or less than a corresponding threshold parameter.

In example embodiments, the weather estimation is for past weather conditions, current weather conditions, forecasted weather conditions, or some combination thereof. In example embodiments, the request location information is determined by a user computing device and indicates the past, current, or future physical location of a user. In example embodiments, at least one of the one or more weather stations has a fixed location, at least one of the one or more weather stations has a non-fixed location, or both.

In accordance with an example embodiment, an apparatus is provided. In an example embodiment, the apparatus comprises at least one processor and at least one memory storing computer program code. The at least one memory and the computer program code configured to, with the processor, cause the apparatus to at least receive request location information; identify one or more weather stations and determining a distance from at least one of the one or more weather stations to a physical location indicated by the request location information; based at least in part on the at least one determined distance, select a weather estimation algorithm; and determine a weather estimation for the physical location indicated by the request location information based at least on the weather estimation algorithm.

In an example embodiment, when the at least one determined distance indicates that a first weather station is within a first distance threshold of the physical location indicated by the request location information, to determine the weather estimation the at least one memory and the computer program code are configured to, with the processor, cause the apparatus to at least: identify a most recent weather report provided by the first weather station, and assign a value to one or more weather parameters of the weather estimation based on the most recent weather report. In an example embodiment, when the at least one determined distance indicates that a weather station is not within a first distance threshold of the physical location indicated by the request location information, and when the at least one determined distance indicates that one or more second weather stations are within a third distance threshold of the physical location indicated by the request location information, the second distance threshold being greater than the first distance threshold, to determine the weather estimation the at least one memory and the computer program code are configured to, with the processor, cause the apparatus to at least: identify one or more most recent weather reports, wherein each of the one or more most recent weather reports was provided by one of the one or more second weather stations, and assign a value to one or more weather parameters of the weather estimation based on an average of corresponding weather parameters from the one or more most recent weather reports. In an example embodiment, when the at least one determined distance indicates that a weather station is not within a first distance threshold of the physical location indicated by the request location information, when the at least one determined distance indicates that a weather station is not within a third distance threshold of the physical location indicated by the request location information, the second distance threshold being greater than the first distance threshold, and when the at least one determined distance indicates that one or more third weather stations are within a third distance threshold of the physical location indicated by the request location information, the third distance threshold being greater than the second distance threshold, to determine the weather estimation the at least one memory and the computer program code are configured to, with the processor, cause the apparatus to at least: identify one or more most recent weather reports, wherein each of the one or more most recent weather reports was provided by one of the one or more third weather stations, and assign a value to one or more weather parameters of the weather estimation based on a weighted average of corresponding weather parameters from the one or more most recent weather reports. In some embodiments, the weights used to compute the weighted average are based at least in part on a distance from the third weather station to the physical location, a time since the weather report was issued, or both.

In an example embodiment, the at least one memory and the computer program code are configured to, with the processor, cause the apparatus to at least: identify one or more most recent weather reports, wherein each of the one or more most recent weather reports was provided by one of the one or more weather stations; determine if a value assigned to a weather parameter of one of the one or more most recent weather reports is an outlier; and when it is determined that a particular value assigned to a particular weather parameter is an outlier, not use the corresponding most recent weather report when assigning a value for the particular weather parameter.

In accordance with an example embodiment, a computer program product is provided. In an example embodiment, the computer program product comprises at least one non-transitory computer-readable storage medium having computer-executable program code instructions stored therein. The computer-executable program code instructions comprise program code instructions configured to receive request location information; identify one or more weather stations and determining a distance from at least one of the one or more weather stations to a physical location indicated by the request location information; based at least in part on the at least one determined distance, select a weather estimation algorithm; and determine a weather estimation for the physical location indicated by the location information based at least on the weather estimation algorithm.

In accordance with yet another example embodiment of the present invention, an apparatus is provided. The apparatus comprises means for receiving request location information. The apparatus may comprise means for identifying one or more weather stations and determining a distance from at least one of the one or more weather stations to a physical location indicated by the request location information. The apparatus may comprise means for, based at least in part on the at least one determined distance, selecting a weather estimation algorithm. The apparatus may further comprise means for determining a weather estimation for the physical location indicated by the request location information based at least one the weather estimation algorithm.

BRIEF DESCRIPTION OF THE DRAWINGS

Figure 1:
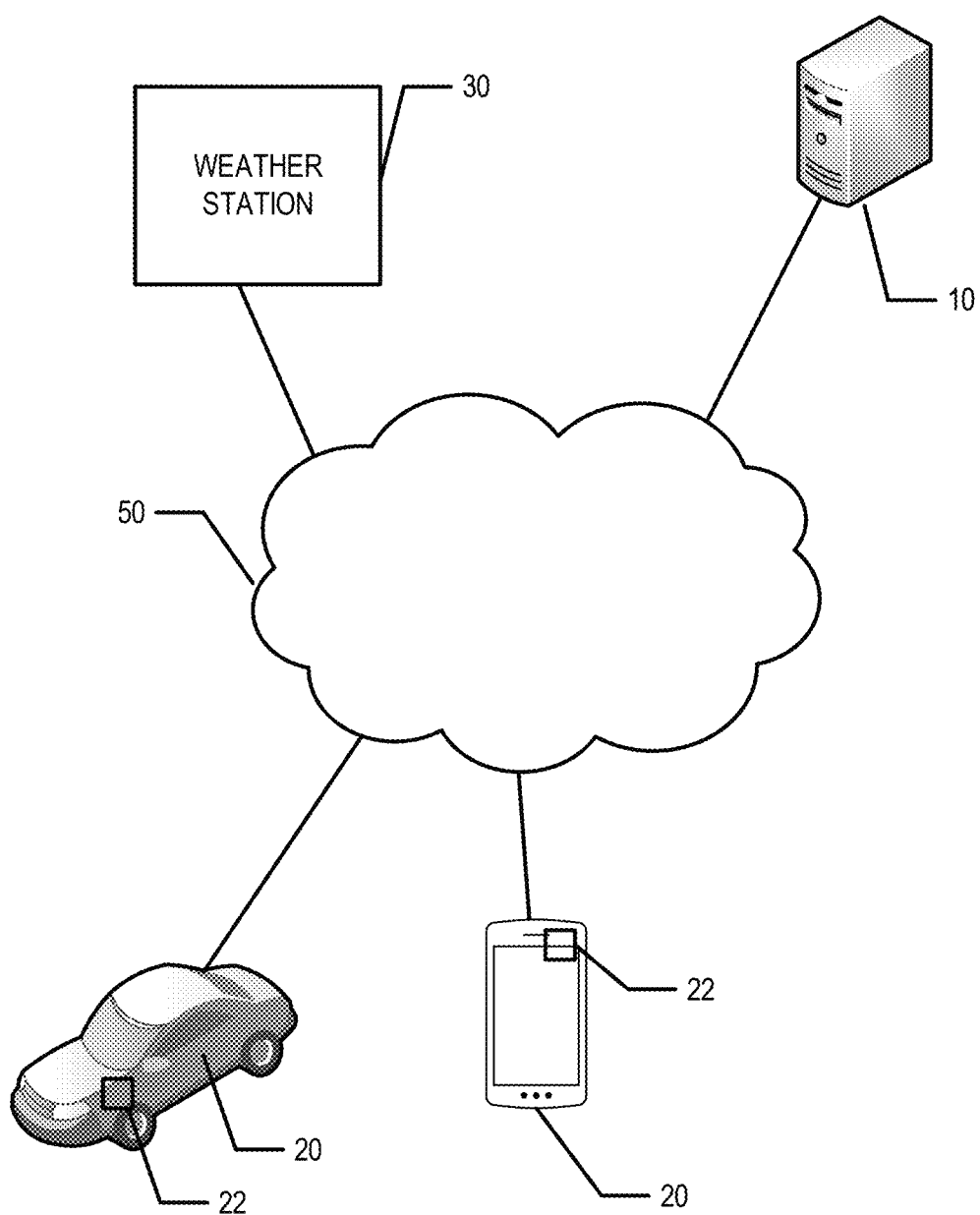
Figure 2:
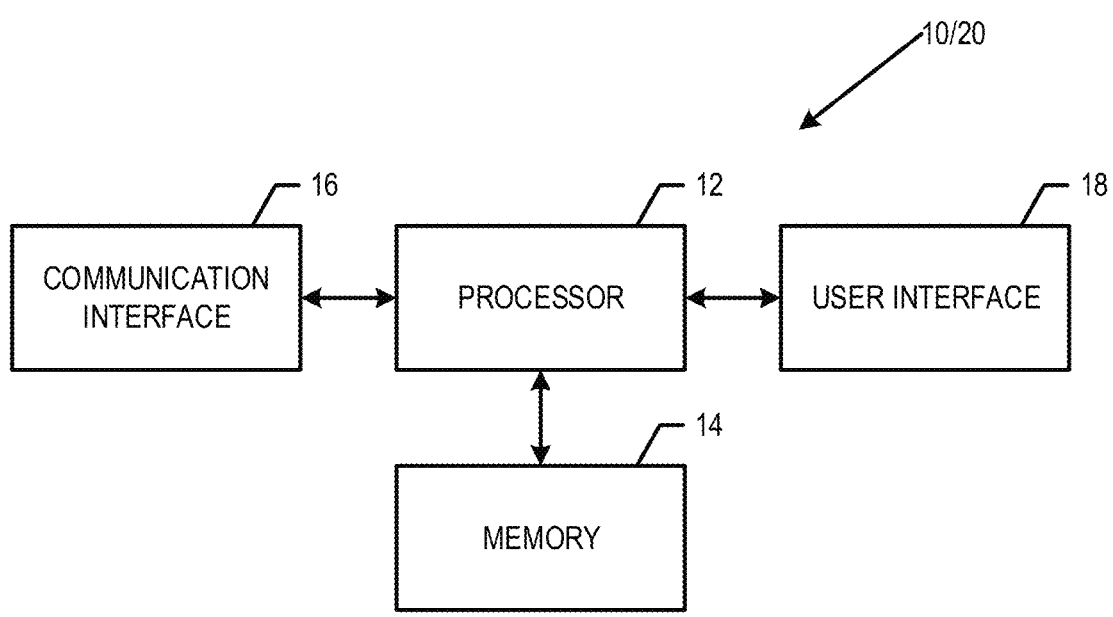
Figure 3:
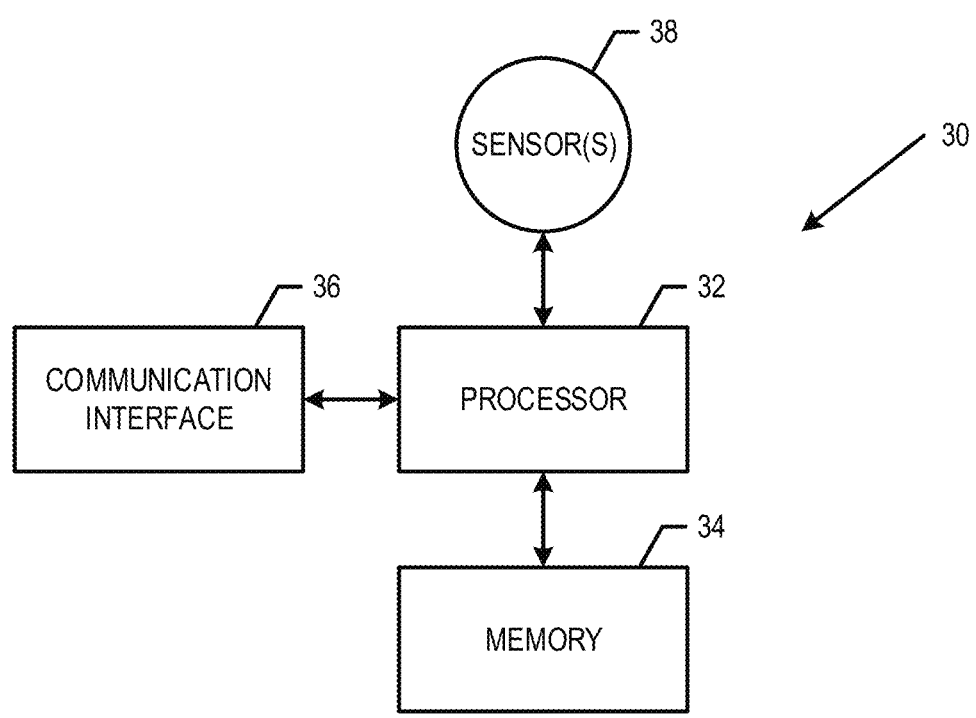
Figure 4:
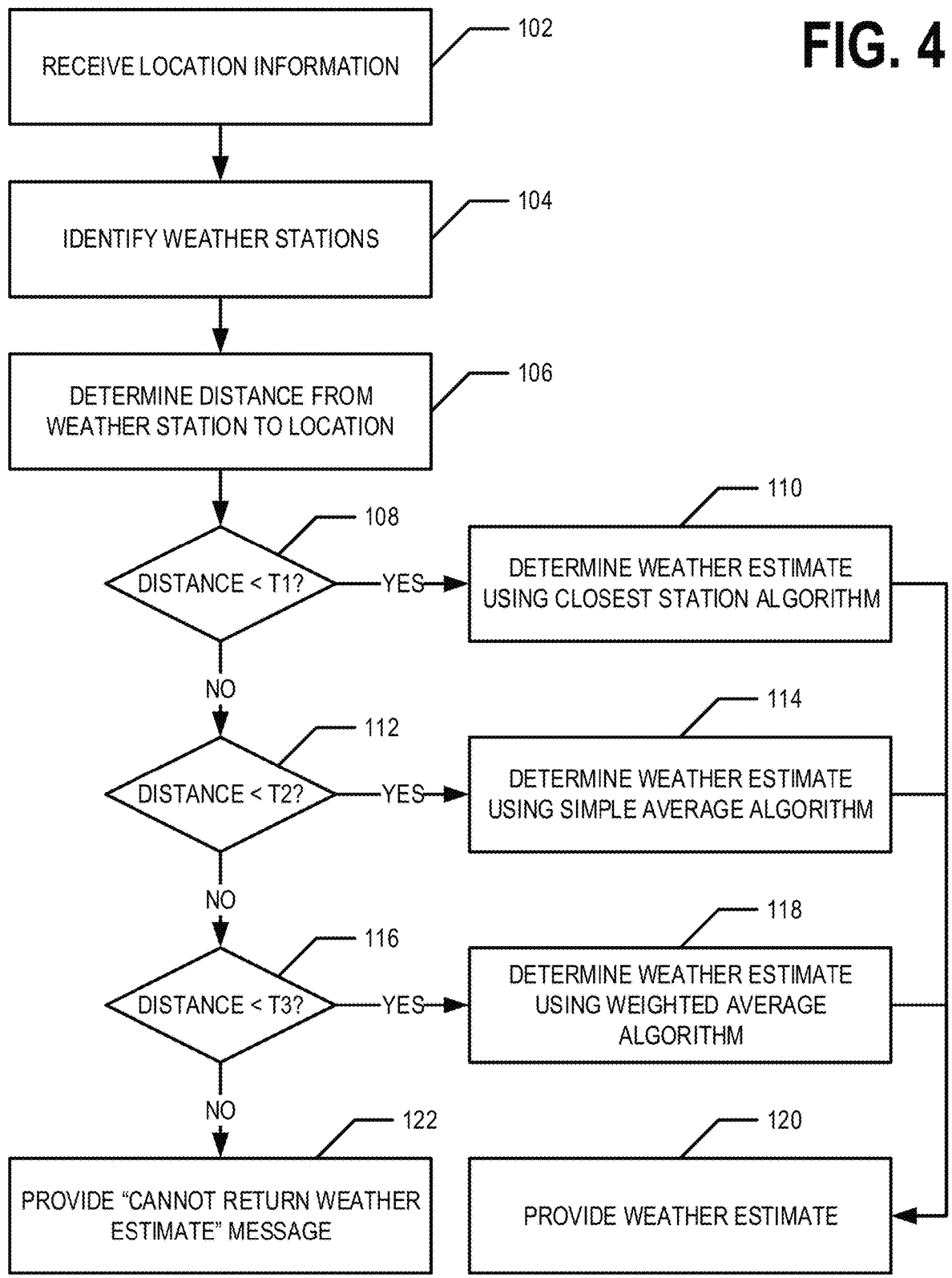
Figure 5:
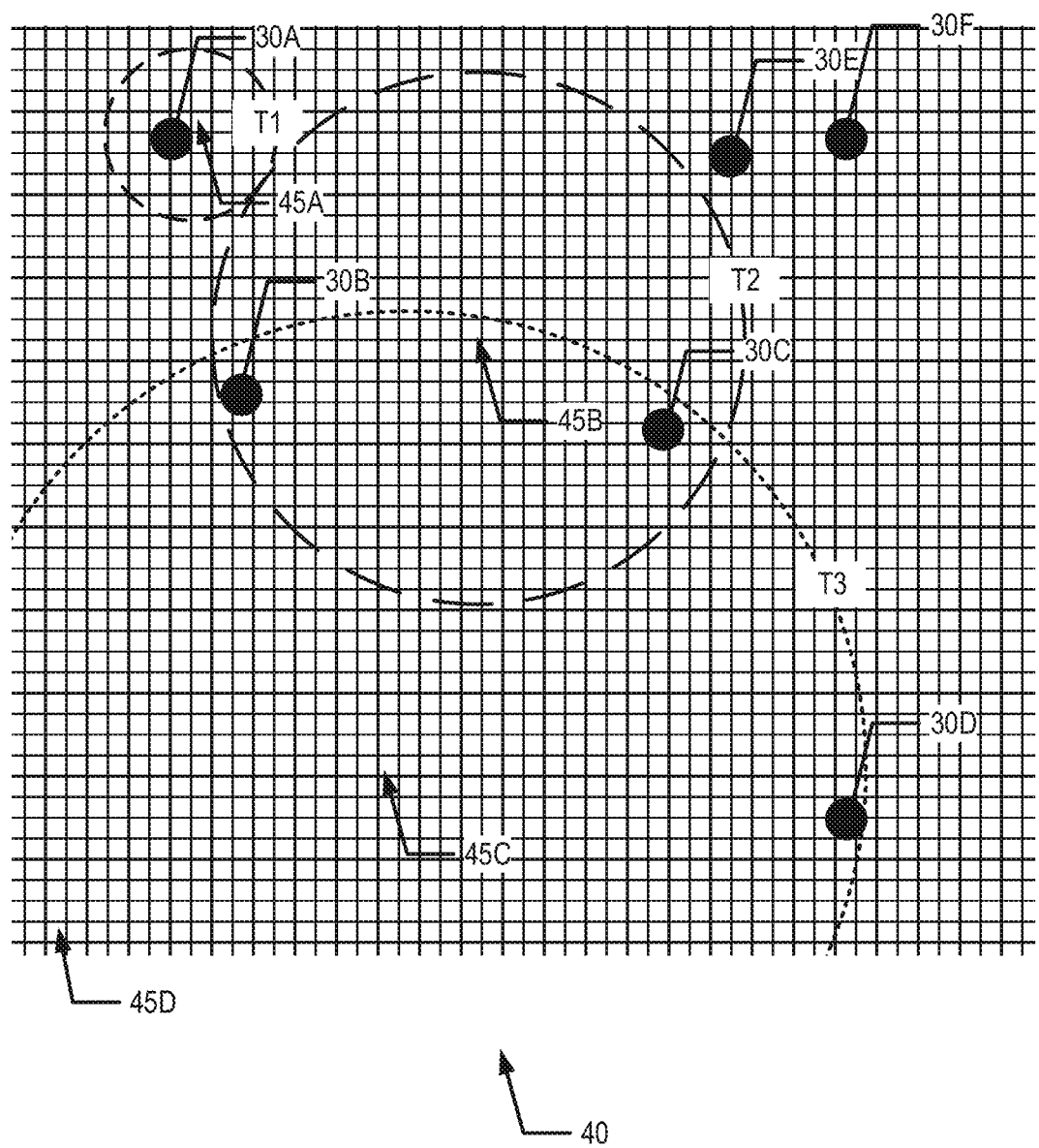
Figure 6:
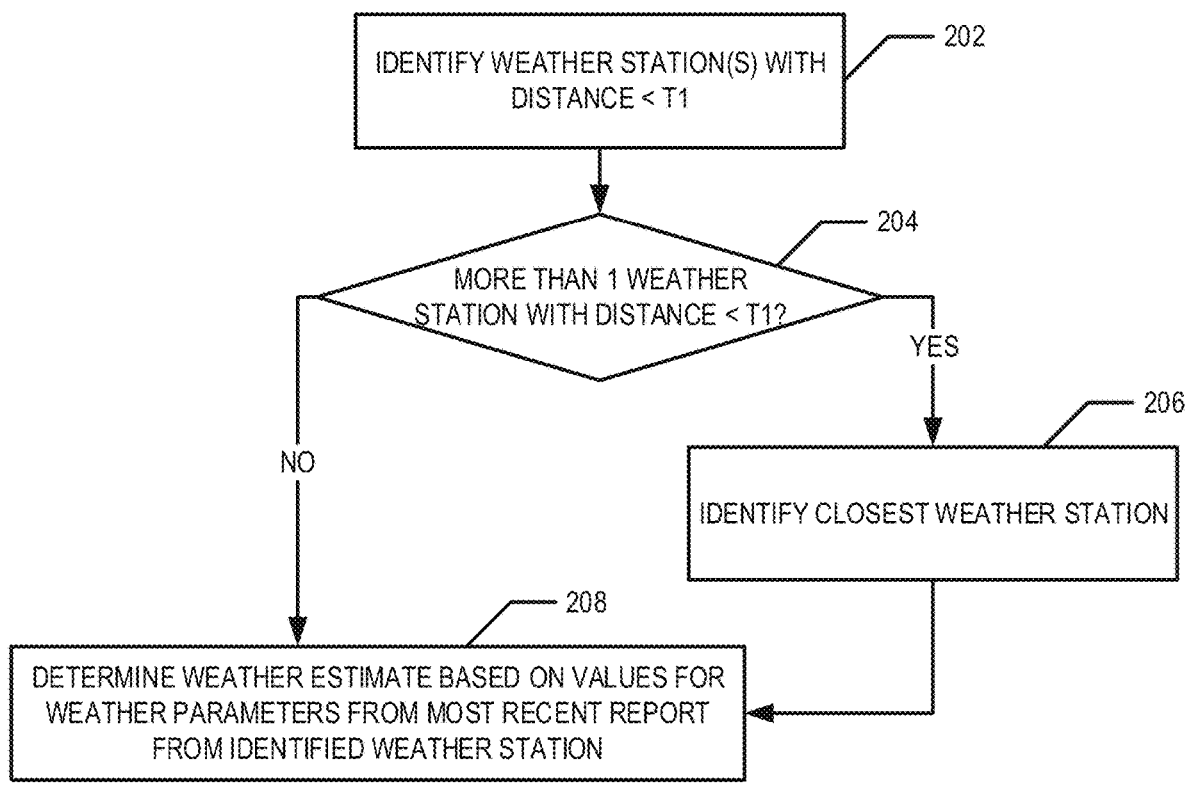
Figure 7:
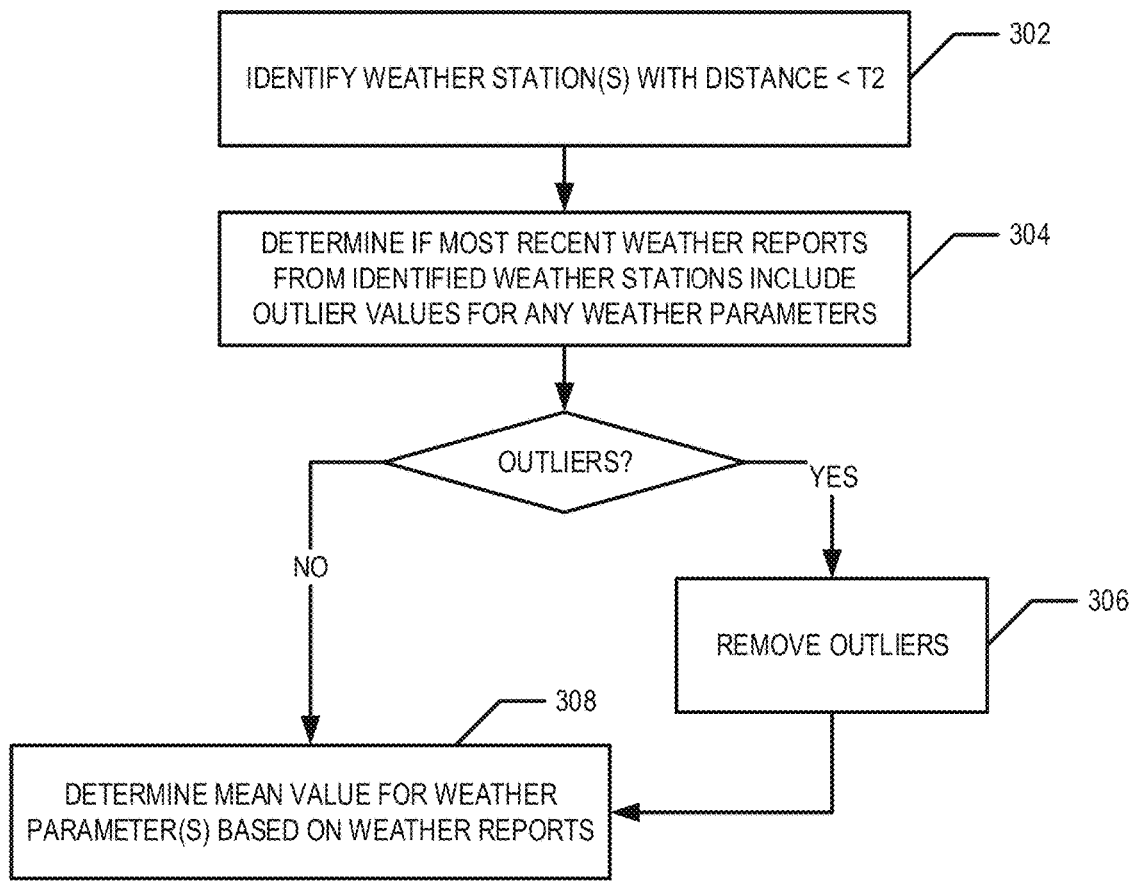
Figure 8:
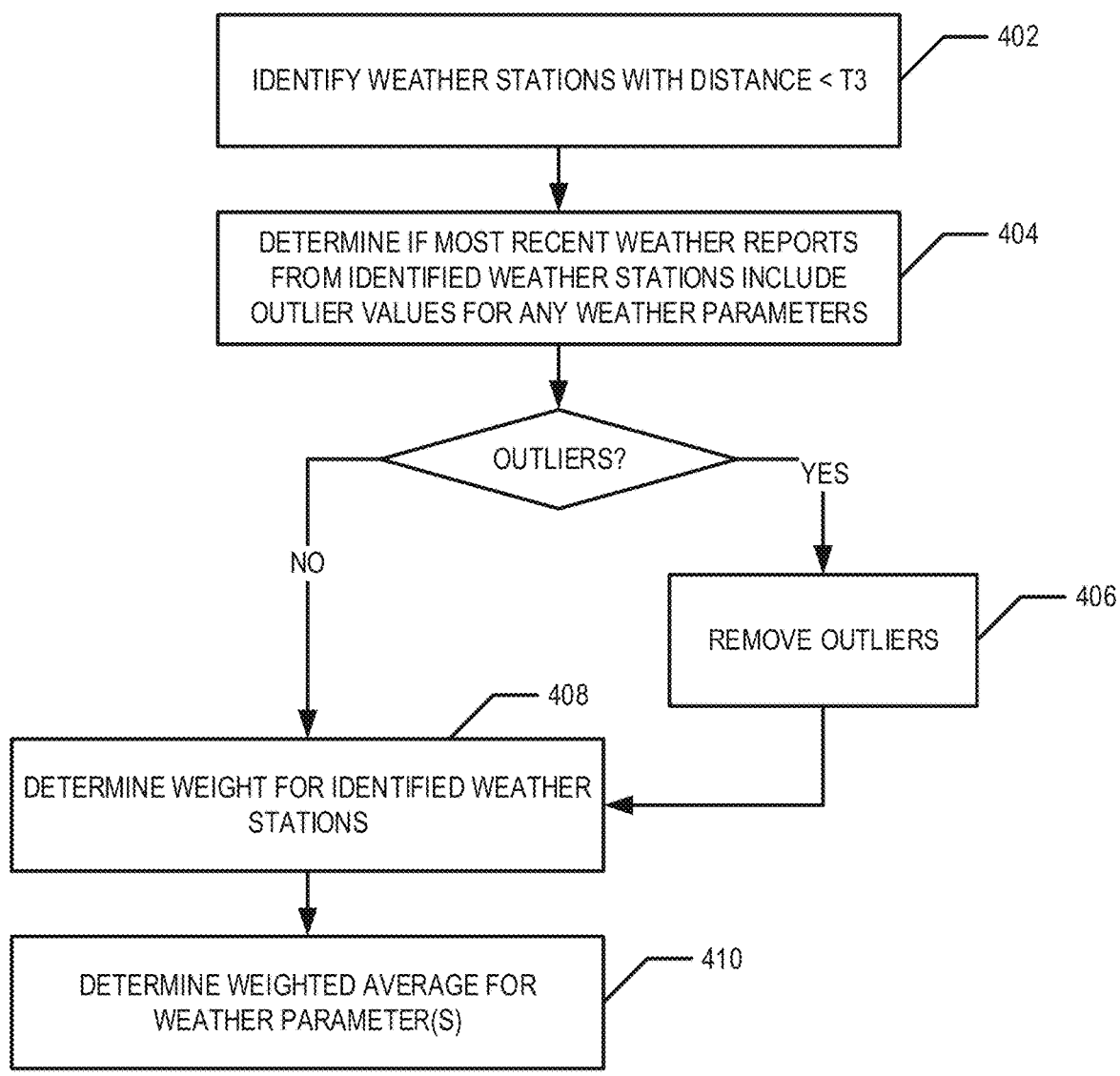
Figure 9:
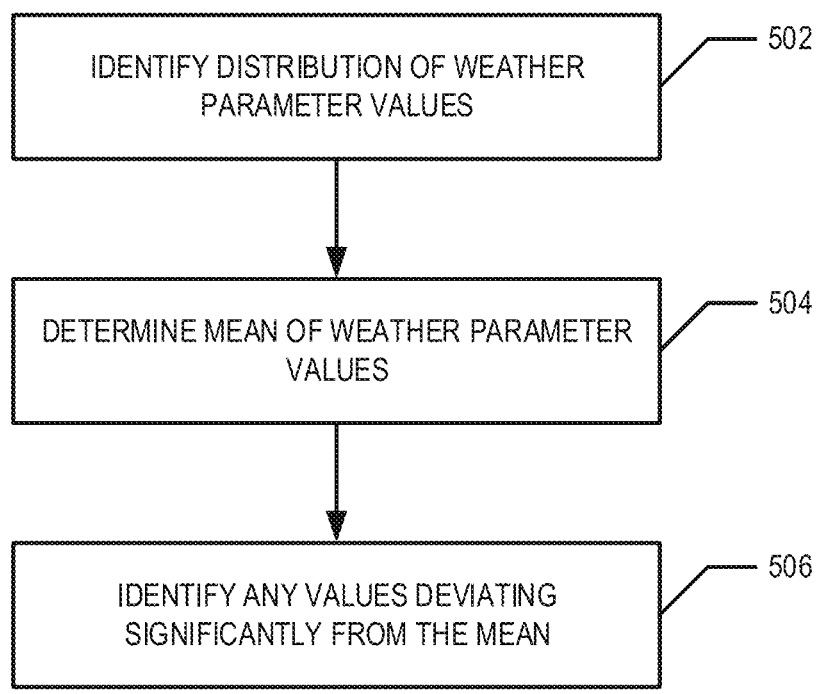
Figure 10:
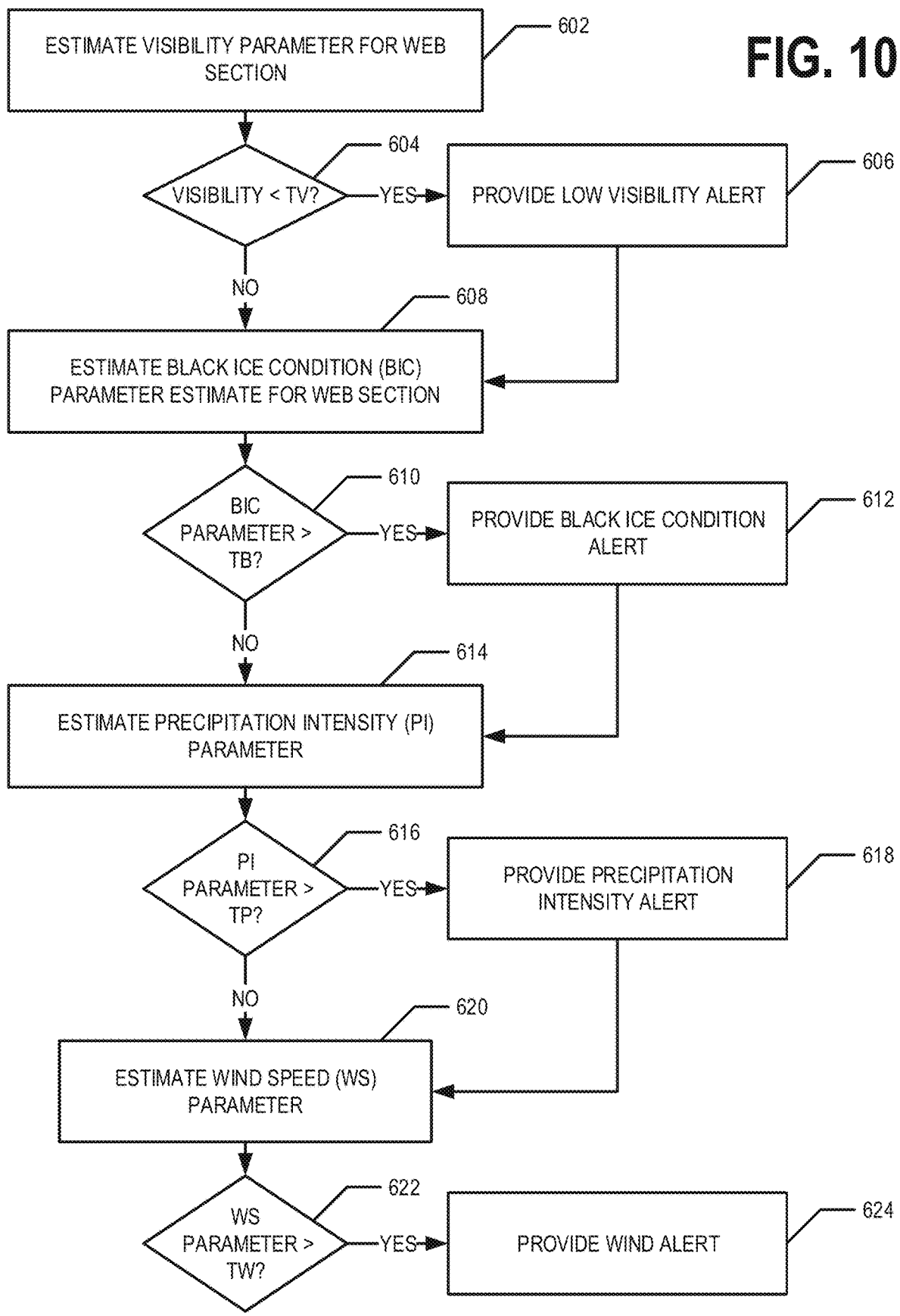

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2 is a block diagram of an apparatus that may be specifically configured in accordance with an example embodiment;

FIG. 3 is a block diagram of a weather station that may be used in accordance with an example embodiment;

FIG. 5 is a diagram of an example web section and weather stations located in the area covered by the example web section, in accordance with an example embodiment;

FIG. 4 is a flowchart illustrating operations performed, such as by the apparatus of FIG. 2, in order to provide a weather estimate, in accordance with an example embodiment;

FIGS. 6, 7, and 8 provide flowcharts illustrating operations performed, such as by the apparatus of FIG. 2, to determine a weather estimate, in accordance with an example embodiment;

FIG. 9 is a flowchart illustrating operations performed, such as by the apparatus of FIG. 2, to identify outliers in the weather parameter data/information, in accordance with an example embodiment; and FIG. 10 is a flowchart illustrating operations performed, such as by the apparatus of FIG. 2, to provide a significant weather alert, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

I. General Overview

Methods, apparatus and computer program products are provided in accordance with an example embodiment in order to provide a weather estimate for a location. In particular, based on the relative position of one or more weather stations with respect to the location, a weather estimate algorithm is selected. The weather estimate algorithm is then used, with weather report information/data provided by one or more weather stations, to determine and provide a weather estimate for the location. In example embodiments, outliers may be removed from the weather report information/data before the weather estimate for the location is determined. In some embodiments, it may be determined if a location is likely experiencing significant weather based on the weather estimate for the location. If the location is likely experiencing significant weather, a significant weather alert may be provided.

FIG. 1 provides an illustration of an example system that can be used in conjunction with various embodiments of the present invention. As shown in FIG. 1, the system may include one or more user apparatus 20, one or more estimate apparatus 10, one or more weather stations 30, one or more networks 50, and/or the like. In various embodiments, the user apparatus 20 may be on board a vehicle and/or in the vicinity of the user. For example, the vehicle may be a motor vehicle, non-motor vehicle car, scooter, truck, van bus, motorcycle, bicycle, Segway, golf cart, and/or the like. In example embodiments, a user may have a user apparatus 20 onboard his or her vehicle and/or in his or her vicinity that may comprise components similar to those shown in the example apparatus 10 diagramed in FIG. 2. The estimate apparatus 10 may be located remotely from the user apparatus 20 (e.g., the estimate apparatus 10 may not be located within the vehicle and/or within the direct vicinity of the user). Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), cellular network, and/or the like. For example, a user apparatus 20 may be in communication with an estimate apparatus 10 via a network 50. For example, an estimate apparatus 10 may in communication with one or more weather stations 30 via a network 50.

In example embodiments, the user apparatus 20 may comprise a processor, memory, a user interface, a location sensor 22 (e.g., a GPS sensor), a communications interface, and/or the like. Similarly, the estimate apparatus 10 may comprise a processor 12, memory 14, a user interface 18, a communications interface 16, and/or other components configured to perform various operations, procedures, functions or the like described herein and as illustrated in FIG. 2. Example embodiments of the user apparatus 20 and the estimate apparatus 10 are described in more detail below.

FIG. 3 shows an example block diagram of a weather station 30. For example, a weather station 30 may comprise one or more sensors 38 for detecting, measuring, sensing, and/or the like one or more weather parameters. Some non-limiting examples of weather parameters are air temperature, dew point temperature, barometric pressure, visibility, humidity, precipitation intensity, and precipitation type. For example, the weather station 30 may comprise one or more sensors 38 configured to detect, measure, sense, and/or the like the air temperature, dew point temperature, barometric pressure, visibility, humidity, precipitation intensity, precipitation type, and/or other weather parameter(s). The weather station 30 may further comprise a processor 32 configured to receive weather parameter information/data from the one or more sensors 38, memory 34, and a communications interface 36. In various embodiments, the processor 32, memory 34, and communications interface 36 may be similar to components of the estimate apparatus 10, as described elsewhere herein. In various embodiments, a weather station 30 may be a static weather station. For example, the location of the weather station 30 may be fixed and unchanging. For example, a weather station 30 may be located at an airport or other fixed location. In example embodiments, one or more weather stations 30 may be mobile. For example, the location of one or more weather stations 30 may not be fixed and may change. For example, one mobile weather station 30 may be a smart phone, a device secured to a vehicle, a temporary weather station set up for a special event, and/or the like comprising one or more sensors 38 for detecting, measuring, sensing, and/or the like one or more weather parameters. In various embodiments, a weather station 30 may further comprise a location sensor (e.g., GPS sensor) for determining and/or providing weather station location information/data indicating the location of the weather station 30. In particular, mobile weather stations may comprise a location sensor. In some embodiments, the memory 34 of a fixed weather station 30 may store weather station location information/data indicating the fixed location of the fixed weather station.

In various situations, a user (e.g., operating a user apparatus 20) or other computing entity may request a weather estimate for a location. For example, request location information/data may be received by the estimate apparatus 10 with a request for a weather estimate. The estimate apparatus 10 may identify one or more weather stations and determine the distance from at least one of the weather stations to the physical location indicated by the request location information/data. The estimate apparatus may then select a weather estimate algorithm based on the determined distance(s) and determine a weather estimate for the physical location indicated by the request location information/data using the selected weather estimate algorithm. The weather estimate may then be provided to the user (e.g., through the user apparatus 20) or other computing entity. In various embodiments, significant weather alerts may be provided to the user or other computing entity in addition and/or in place of the weather estimate.

II. Exemplary Operation

As described above, example embodiments of the present invention provide for selecting a weather estimation algorithm for use in providing a weather estimate based on weather reports from one or more weather stations. Some embodiments of the present invention may further provide a significant weather alert for locations estimated to be experiencing significant weather. Various aspects of the example embodiments of the present invention are discussed in more detail below.

Selecting a Weather Estimation Algorithm

FIG. 4 provides a flowchart illustrating various operations and procedures that may be completed in accordance with an example embodiment of the present invention to select a weather estimation algorithm and provide a weather estimate based thereon. In various embodiments, a weather estimate may comprise an estimated value for one or more weather parameters. For example, a weather estimate may comprise estimated values for one or more of air temperature, dew point temperature, barometric pressure, visibility, humidity, precipitation intensity, precipitation type, and/or the like. In various embodiments, a weather estimate may comprise estimated values for one or more current weather parameters and/or one or more forecasted weather parameters.

Starting at block 102, request location information/data is received. For example, the user apparatus 20 may determine request location information/data. For example, the location sensor 22 (e.g., GPS sensor) of the user apparatus 20 may determine request location information/data for the user. In various embodiments, the request location information/data may indicate the current physical location of the user (e.g., the user apparatus 20) or another location a user may be interested in. For example, in one embodiment a user (e.g., operating a user apparatus 20) may enter or select an address or select a location from a map, and/or the like using a user interface of the user apparatus 20 and the request location information/data may indicate the location provided through the user input to the user interface. The user apparatus 20 may provide, transmit, and/or the like the request location information such that estimate apparatus 10 receives the request location information/data. In example embodiments, the estimate apparatus 10 may receive request location information/data. For example, the estimate apparatus 10 may comprise means, such as the processor 12, the communication interface 16 or the like, for receiving the request location information/data.

In example embodiments, the request location information/data indicates an actual physical location (as determined by location sensor 22 or as provided by user input). In some example embodiments, a web 40 may be used to describe a region, as shown in FIG. 5. Each web section 45 (e.g., 45A, 45B, 45C), may be a portion of the region. In various embodiments, the web may be a grid. For example, the web may be a grid having square sections that measure a few kilometers by a few kilometers, and/or the like. In such embodiments, a preselected point within the web section 45 (e.g., the centroid of the web section) may act as a proxy location for any location located within the web section. For example, the centroid of the web section 45 may be used as a proxy for a physical location indicated by the request location information/data and located within the web section 45. For example, the request location information/data may indicate that a user is located within web section 45A. The centroid or another point within web section 45A may then be used as a proxy for the physical location indicated by the request location information/data when determining the weather estimate. In some embodiments, the request location information/data itself may be used when determining the weather estimate. In one embodiment, the request location information/data identifies a web section 45 and/or a point within a web section.

In various embodiments, a web 40 may be defined by a set of parallel and perpendicular web section boundaries. For example, as illustrated in FIG. 5, a web 40 may comprise square web sections 45. In other embodiments, web sections 45 may be defined by boundaries which are curved, not parallel and/or perpendicular to one or more other boundaries, and/or the like. In various embodiments, the web sections 45 may be a uniform tiling of the region. In other embodiments, the web sections 45 may vary in size and/or shape based on the geography of the region, the topology of the region, population density within the region, weather station density within the region, and/or the like.

Returning to FIG. 4, at block 104 weather stations are identified. In example embodiments, the estimate apparatus 10 may identify one or more weather stations. For example, the estimate apparatus 10 may comprise means, such as the processor 12, the communication interface 16 or the like, for identifying one or more weather stations. In an example embodiment, a plurality of weather reports have been received, for example, by the estimate apparatus 10. Each weather report may comprise weather information/data indicating a measurement for at least one weather parameter, a time stamp, a weather station identifier, station location information/data indicating the physical location of the weather station at the time the measurement of the at least one weather parameter was captured, and/or the like. For example, a weather report may indicate that weather station KORD is located at 41.9786° N, 87.9047° W and at 1:04 pm CST on Mar. 7, 2016 captured weather parameter measurements indicating that the air temperature is 59.9° F., the dew point temperature is 49° F., current precipitation intensity is 0 inches per hour, current wind speed is 4 mph from the east-northeast, and/or the like. In various embodiments, a weather report may include measurements of current weather parameters (e.g., current when the measurement was captured) and/or include forecasted weather parameters. In some embodiments, to identify one or more weather stations, the most recent weather report from one or more weather stations may be identified. In example embodiments, a list of weather stations may be used to identify one or more weather stations. The identified weather stations may be in the same general region as the physical location indicated by the request location information/data. For example, if the request location information/data indicates a location in Georgia, a weather station in California may not be identified. In another example embodiment, if the request location information/data indicates a location in Chicago, Ill., a weather station in Springfield, Ill. may not be identified. In an example embodiment, one or more weather stations 30 within a threshold distance (e.g., a third threshold distance T3 described elsewhere herein) of the physical location indicated by the request location information/data may be identified.

At block 106, the distance between the physical location indicated by the request location information/data and at least one of the identified weather stations 30 is determined. In example embodiments, the estimate apparatus 10 may determine the distance between the physical location indicated by the request location information/data and at least one of the weather stations 30. For example, the estimate apparatus 10 may comprise means, such as the processor 12 or the like, for determining the distance between the physical location indicated by the request location information/data and at least one of the weather stations 30. In various embodiments the distance between the physical location indicated by the request location information/data and a plurality of identified weather stations 30 may be determined. It should be understood that the distance between the physical location indicated by the request location information/data and a weather station 30 may be determined using a variety of methods. The determined distance may be based on the request location information/data and/or the weather station location information/data.

At block 108, it is determined if any weather stations 30 are within a first threshold distance T1 of the physical location indicated by the request location information/data. In example embodiments, the estimate apparatus 10 may determine if any weather stations are within a first threshold distance T1 of the physical location indicated by the request location information/data. For example, the estimate apparatus 10 may comprise means, such as the processor 12 or the like, for determining if any weather stations are within a first threshold distance T1 of the physical location indicated by the request location information/data. For example the first threshold T1 may be a predetermined distance in the range of 1 to 20 kilometers. Thus, it may be determined if the distance between the physical location indicated by the request location information/data is less than a first threshold distance T1.

If it is determined at block 108 that there is a weather station 30 located within a first threshold distance T1, the process may continue to block 110. At block 110, a first weather estimate algorithm is used to determine a weather estimate for the physical location indicated by the request location information/data. For example, the estimate apparatus 10 may use a first weather estimate algorithm to determine a weather estimate for the physical location indicated by the request location information/data For example, the estimate apparatus 10 may comprise means, such as the processor 12, the communication interface 16 or the like, for using a first weather estimate algorithm to determine a weather estimate for the physical location indicated by the request location information/data. For example, for the region illustrated in FIG. 5, a physical location indicated by the request location information/data is located in web section 45A. The dashed circle about web section 45A shows the first threshold distance T1. Weather station 30A is located within the dashed circle indicating that weather station 30A is within the first threshold distance of the physical location indicated by the request location information/data. Thus, the most recent weather report from weather station 30A may be used to determine the weather estimate using the first weather estimate algorithm.

In example embodiments, the first weather estimate algorithm is a closest weather station algorithm. For example, a closest weather station algorithm may include identifying the closest weather station 30 and using one or more weather parameters from the most recent weather report provided by the closest weather station 30 to provide a weather estimate. For example, if the most recent report from the closest weather station 30 reports that the air temperature is 70° F., the estimate provided of the air temperature at the physical location indicated by the request location information/data according to the closest weather station algorithm is 70° F.

Continuing with FIG. 4, at block 120, the weather estimate is provided. For example, the estimate apparatus 10 may provide the weather estimate. For example, the estimate apparatus 10 may comprise means, such as the processor 12, the communication interface 16 or the like, for providing the weather estimate. For example, the user apparatus 20 may receive the weather estimate (e.g., via a communications interface thereof). In various embodiments, the user apparatus 20 may provide and/or display the weather estimate through a user interface thereof, provide one or more alerts to a user (e.g., through a user interface) based on the weather estimate, and/or the like.

If at block 108, there are no weather stations 30 located at a distance less than a first threshold T1 from the physical location indicated by the request location information/data, it is determined if there are any weather stations 30 located within a second threshold distance T2 from the physical location indicated by the request location information/data, at block 112. In example embodiments, the estimate apparatus 10 may determine if any weather stations are within a second threshold distance T2 of the physical location indicated by the request location information/data. For example, the estimate apparatus 10 may comprise means, such as the processor 12 or the like, for determining if any weather stations 30 are within a second threshold distance T2 of the physical location indicated by the request location information/data. In various embodiments, the second threshold distance T2 may be a predetermined distance between 15 and 75 kilometers.

If it is determined at block 112 that there are one or more weather stations located within a second distance threshold T2 of the physical location indicated by the request location information/data, then a weather estimate is determined using a second weather estimate algorithm, at block 114. For example, the estimate apparatus 10 may determine a weather estimate using a second weather estimate algorithm. For example, the estimate apparatus 10 may comprise means, such as the processor 12, the communication interface 16 or the like, for determining a weather estimate using a second weather estimate algorithm. For example, for the region illustrated in FIG. 5, a physical location indicated by the request location information/data is located in web section 45B. The long dashed circle about web section 45B shows the second threshold distance T2. Weather stations 30B and 30C are located within the long dashed circle indicating that weather stations 30B and 30C are within the second threshold distance T2 of the physical location indicated by the request location information/data. Thus, the most recent weather report from weather stations 30B and/or 30C may be used to determine the weather estimate using the second weather estimate algorithm.

In example embodiments, the second weather estimate algorithm is an averaging algorithm. For example, the air temperature estimate may be determined by finding the mean of the air temperature measurement for all and/or a subset of the weather stations 30 located within a second distance threshold T2 of the physical location indicated by the request location information/data. For example, a first weather station may be located at a first distance and report an air temperature of 70° F. and a second weather station may be located at a second distance and report an air temperature of 75° F., wherein the first and second distances are between the first threshold distance T1 and the second threshold distance T2. The weather estimate, according to the averaging algorithm would be 72.5° F. The weather estimate may be provided, at block 120, as shown in FIG. 4.

If it is determined at block 112 that there are no weather stations 30 located within the second distance threshold T2 of the physical location indicated by the request location information/data, the process continues to block 116. At block 116, it is determined if one or more weather stations 30 are located within a third distance threshold T3 of the physical location indicated by the request location information/data. In example embodiments, the estimate apparatus 10 may determine if any weather stations 30 are within a third threshold distance T3 of the physical location indicated by the request location information/data. For example, the estimate apparatus 10 may comprise means, such as the processor 12 or the like, for determining if any weather stations 30 are within a third threshold distance T3 of the physical location indicated by the request location information/data. In various embodiments, the third threshold distance T3 may be a predetermined distance between 50 and 200 kilometers.

If it is determined at block 116 that there are one or more weather stations located within a third distance threshold T3 of the physical location indicated by the request location information/data, then a weather estimate is determined using a third weather estimate algorithm, at block 118. For example, the estimate apparatus 10 may determine a weather estimate using a third weather estimate algorithm. For example, the estimate apparatus 10 may comprise means, such as the processor 12, the communication interface 16 or the like, for determining a weather estimate using a third weather estimate algorithm. For example, for the region illustrated in FIG. 5, a physical location indicated by the request location information/data is located in web section 45C. The dotted circle about web section 45C shows the third threshold distance T3. Weather stations 30B, 30C, and 30D are located within the dotted circle indicating that weather stations 30B, 30C, and 30D are within the third threshold distance T3 of the physical location indicated by the request location information/data. Thus, the most recent weather report from weather stations 30B, 30C, and/or 30D may be used to determine the weather estimate using the third weather estimate algorithm.

In example embodiments, the third weather estimate algorithm is a weighted averaging algorithm. In various embodiments, weather parameter values provided by one or more weather stations may be weighted based on the distance of the weather station to the physical location indicated by the request location information/data, the length of time that has passed since the weather station submitted or issued the weather report providing the weather parameter(s), and/or the like. For example, the air temperature estimate may be determined by finding a weighted average of the air temperature measurement for all and/or a subset of the weather stations located within a third distance threshold T3 of the physical location indicated by the request location information/data. The weather estimate may then be provided, at block 120, as shown in FIG. 4.

If at block 116, it is found that there are no weather stations 30 within the third distance threshold T3, the process may continue to block 122. At block 122, a message may be provided indicating that a weather estimate cannot be provided. For example, the estimate apparatus 10 may provide a message indicating that a weather estimate cannot be provided. For example, the estimate apparatus 10 may comprise means, such as the processor 12, the communication interface 16 or the like, for providing a message indicating that a weather estimate cannot be provided. For example, for the region illustrated in FIG. 5, a physical location indicated by the request location information/data is located in web section 45D. However, there are no weather stations 30 located within a first threshold distance T1, a second threshold distance T2, or a third threshold distance T3 of web section 45D. Therefore, in an example embodiment, it may be determined that no weather estimate can be provided for the physical location located in web section 45D.

It should be understood that in various embodiments, there may be more or less than three threshold distances and/or more or less than three weather estimate algorithms utilized. It should further be noted that, for example, if there is only one weather station within the third distance threshold T3 of the physical location indicated by the request location information/data and the most recent report from that weather station is outdated (e.g., more than an hour old, more than four hours old, more than twelve hours old, more than twenty four hours old, and/or the like), it may be determined that no weather estimate may be provided.

Exemplary Closest Weather Station Algorithm

FIG. 6 illustrates a flowchart for determining a weather estimate using a closest weather station algorithm according to example embodiments. Starting at block 202, one or more weather stations 30 located within a first threshold distance T1 of the physical location indicated by the request location information/data are identified. For example, the estimate apparatus 10 may identify one or more weather stations 30 located within a first threshold distance T1 of the physical location indicated by the request location information/data. For example, the estimate apparatus 10 may comprise means, such as the processor 12, the communication interface 16 or the like, for identifying one or more weather stations 30 located within a first threshold distance T1 of the physical location indicated by the request location information/data.

At block 204, it is determined if more than one weather station 30 was identified at block 202. For example, the apparatus 10 may determine more than one weather station 30 was identified at block 202. For example, the estimate apparatus 10 may comprise means, such as the processor 12, the communication interface 16 or the like, for determining if more than one weather station 30 was identified at block 202.

If more than one weather station 30 was identified at block 202, the closest weather station 30 to the physical location indicated by the request location information/data is identified at block 206. For example, the estimate apparatus 10 may identify the weather station 30 that is located closest (e.g., at the least distance) from the physical location indicated by the request location information/data. For example, the estimate apparatus 10 may comprise means, such as the processor 12, the communication interface 16 or the like, for identifying the weather station 30 that is located closest (e.g., at the least distance) from the physical location indicated by the request location information/data.

At block 208, the weather estimate is determined. For example, the estimate apparatus 10 may determine the weather estimate. For example, the estimate apparatus 10 may comprise means, such as the processor 12, the communication interface 16 or the like, for determining the weather estimate. The weather estimate may be determined based on the values of one or more weather parameters provided in the most recent weather report provided by the closest weather station 30. For example, if the closest weather station 30 most recently reported that the air temperature was 70° F., the weather estimate would indicate that the air temperature is approximately 70° F.

In an example embodiment, before determining the weather estimate, for example, the value of one or more weather parameters most recently reported by the closest weather station 30 may be checked against corresponding weather parameter values most recently reported by one or more nearby weather stations 30. For example, it may be determined if the value of one or more weather parameters most recently reported by the closest weather station 30 is an outlier compared to corresponding weather parameters most recently reported by nearby weather stations 30. If an outlier is identified, the value for that particular weather parameter provided by the next closest weather station 30 may be used (e.g., if there is more than one weather station 30 within the first threshold distance T1) or another weather estimation algorithm may be used to determine that particular weather parameter for the weather estimate (e.g., if there is only one weather station 30 within the first threshold distance T1). In various embodiments, if a particular weather parameter provided by the most recent weather report submitted or issued by the closest weather station 30 is identified as an outlier, the estimation of weather parameters other than the particular weather parameter may not be affected.

Exemplary Averaging Algorithm

FIG. 7 illustrates a flowchart of an averaging algorithm according to example embodiments. Starting at block 302, one or more weather stations 30 located within a second threshold distance T2 of the physical location indicated by the request location information/data are identified. For example, the estimate apparatus 10 may identify one or more weather stations 30 located within a second threshold distance T2 of the physical location indicated by the request location information/data. For example, the estimate apparatus 10 may comprise means, such as the processor 12, the communication interface 16 or the like, for identifying one or more weather stations 30 located within a second threshold distance T2 of the physical location indicated by the request location information/data.

At block 304, it is determined if any of the weather parameter values for the most recent weather report submitted by the weather station(s) 30 identified at block 302 are outliers. For example, at block 302, three weather stations may be identified. The first weather station may have most recently reported the air temperature to be 70° F., the second weather station may have most recently reported the air temperature to be 68° F., and a third weather station may have most recently reported the air temperature to be 0° F. The air temperature reported by the third weather station (e.g., 0° F.) may be identified as an outlier. For example, the estimate apparatus 10 may determine if any of the weather parameter values for the most recent weather report submitted by the weather station(s) identified at block 302 are outliers. For example, the estimate apparatus 10 may comprise means, such as the processor 12, the communication interface 16 or the like, for determining any of the weather parameter values for the most recent weather report submitted by the weather station(s) identified at block 302 are outliers.

If it is determined that there is at least one outlier in the weather parameter values for the most recent weather report submitted by the weather station(s) identified at block 302, the process continues to block 306. At block 306, the one or more outliers are removed from consideration. For example, the estimate apparatus 10 may remove one or more outliers from consideration. For example, the estimate apparatus 10 may comprise means, such as the processor 12, the communication interface 16 or the like, for removing one or more outliers from consideration. For example, when the estimated air temperature is determined, the air temperature reported by the first and second weather stations (e.g., 70° F. and 68° F.) will be used and the outlier value for the air temperature reported by the third weather station (e.g., 0° F.) will not be used.

At block 308, the values reported by the one or more weather stations 30 identified at block 302 for one or more weather parameters may be averaged (e.g., the mean value may be determined). For example, the estimate apparatus 10 may determine the average (e.g., mean) reported value for one or more weather parameters. For example, the estimate apparatus 10 may comprise means, such as the processor 12, the communication interface 16 or the like, for determining the average (e.g., mean) reported value for one or more weather parameters. For example, if the first weather station most recently reported the air temperature to be 70° F. and the second weather station most recently reported the air temperature to be 68° F., the estimated air temperature at the physical location indicated by the request location information/data would be 69° F.

Exemplary Weighted Average Algorithm

FIG. 8 illustrates a flowchart of a weighted average algorithm according to example embodiments. Starting at block 402, one or more weather stations 30 located within a third threshold distance T3 of the physical location indicated by the request location information/data are identified. For example, the estimate apparatus 10 may identify one or more weather stations 30 located within a third threshold distance T3 of the physical location indicated by the request location information/data. For example, the estimate apparatus 10 may comprise means, such as the processor 12, the communication interface 16 or the like, for identifying one or more weather stations 30 located within a third threshold distance T3 of the physical location indicated by the request location information/data.

At block 404, it is determined if any of the weather parameter values for the most recent weather report submitted by the weather station(s) 30 identified at block 402 are outliers. For example, at block 402, three weather stations may be identified. The first weather station may have most recently reported the air temperature to be 70° F., the second weather station may have most recently reported the air temperature to be 68° F., and a third weather station may have most recently reported the air temperature to be 0° F. The air temperature reported by the third weather station (e.g., 0° F.) may be identified as an outlier. For example, the estimate apparatus 10 may determine if any of the weather parameter values for the most recent weather report submitted by the weather station(s) 30 identified at block 402 are outliers. For example, the estimate apparatus 10 may comprise means, such as the processor 12, the communication interface 16 or the like, for determining any of the weather parameter values for the most recent weather report submitted by the weather station(s) 30 identified at block 402 are outliers.

If it is determined that there is at least one outlier in the weather parameter values for the most recent weather report submitted by the weather station(s) identified at block 402, the process continues to block 406. At block 406, the one or more outliers are removed from consideration. For example, the estimate apparatus 10 may remove one or more outliers from consideration. For example, the estimate apparatus 10 may comprise means, such as the processor 12, the communication interface 16 or the like, for removing one or more outliers from consideration. For example, when the estimated air temperature is determined, the air temperature reported by the first and second weather stations (e.g., 70° F. and 68° F.) will be used and the outlier value for the air temperature reported by the third weather station (e.g., 0° F.) will not be used.

At block 408, the weights for different weather stations are determined. For example, the estimate apparatus 10 may determine weights for one or more weather stations 30. For example, the estimate apparatus 10 may comprise means, such as the processor 12, the communication interface 16 or the like, for determining weights for one or more weather stations 30. In various embodiments, the weight used for a weather station 30 may depend on the distance from the weather station 30 to the physical location indicated in by the request location information/data, the time since the most recent weather report was submitted or issued by the weather station, a quality score for weather station, and/or the like. In an example embodiment, the weight for a weather station i is determined as $weight_i = distWeight * timeWeight * Q$, wherein distWeight is a weight factor based on the distance from the weather station i to the physical location indicated by the request location information/data, timeWeight is a weight factor based on the time since the most recent weather report was submitted/issued by the weather station i, and Q is a weight factor based on the quality score for the weather station i. In an example embodiment, $$distWeight = 1 - e^{-\frac{d}{distanceFromLocation}} \text{ and}$$

$$timeWeight = 1 - e^{-\frac{t}{timeSinceReport}},$$

where d and t are constants and may depend on the weather parameter for which the weighted average is to be determined. For example, d and t may be weather parameter dependent constants. In an example embodiment, d and t may be between 1 and 20, and/or another value.

For example, the first weather station may be located at a distance 30 km from the physical location indicated by the request location information/data and the second weather station may be located at a distance 40 km from the physical location indicated by the request location information/data. The most recent weather report from the first weather station may have been submitted/issued 20 minutes ago and the most recent weather report from the second weather station may be submitted/issued 1 minute ago. In the present example, we take d=10 km and t=5 minutes. In this example, we'll assume both the first and second weather station have a quality score of Q=1. Then, in this example, the weight for the first weather station is 0.063 and the weight for the second weather station is 0.220.

At block 410, the weighted average for one or more weather parameters may be determined. For example, the estimate apparatus 10 may determining the weighted average for one or more weather parameters. For example, the estimate apparatus 10 may comprise means, such as the processor 12, the communication interface 16 or the like, for determining the weighted average for one or more weather parameters. For example, the average weather parameter may be equal to $$\sum_i \frac{weight_i}{totalweight} * Parameter_i,$$

where Parameter, is the value for the parameter reported by weather station i and $$totalweight = \sum_i weight_i.$$

In the example described above, the estimated air temperature, based on the air temperature more recently reported by the first and second weather stations would be 68.4° F.

Exemplary Method of Identifying Outliers

FIG. 9 provides a flowchart of determining if any of the weather parameter values of a set of weather parameter values are outliers. At block 502, the distribution of weather parameter values for a particular weather parameter is identified. For example, the estimate apparatus 10 may identify the distribution of weather parameter values for a particular weather parameter. For example, the estimate apparatus 10 may comprise means, such as the processor 12, the communication interface 16 or the like, for identifying the distribution of weather parameter values for a particular weather parameter. For example, one or more weather stations 30 may be identified in a particular area (e.g., as at blocks 302 and 402) and the most recent weather reports submitted/issued by the identified weather stations may be accessed. A distribution of values for a particular weather parameter may be identified or defined based on the accessed weather reports.

At block 504, the mean value of the distribution of weather parameter values is determined. For example, the estimate apparatus 10 may determine the mean value of the distribution of weather parameter values. For example, the estimate apparatus 10 may comprise means, such as the processor 12, the communication interface 16 or the like, for determining the mean value of the distribution of weather parameter values.

At block 506, any values deviating significantly from the mean of the distribution of weather parameter values are identified as outliers. For example, the estimate apparatus 10 may identify any values deviating significantly from the mean of the distribution of weather parameter values as outliers. For example, the estimate apparatus 10 may comprise means, such as the processor 12, the communication interface 16 or the like, for identifying any values deviating significantly from the mean of the distribution of weather parameter values as outliers. For example, any weather parameter values that are more than two or more than three or more standard deviations from the mean of the distribution may be identified as outliers. In another example, any weather parameter values having a t-score or z-score with an absolute value greater than two or greater than three or more may be identified as outliers. In various embodiments, weather parameters deviating significantly from the mean of the distribution of weather parameter values may be identified as outliers.

Exemplary Significant Weather Alert

As noted above, in example embodiments, a significant weather alert may be provided if it is estimated that current weather conditions at a particular location or web section are significant and/or that estimated future weather conditions at a particular location or web section are expected to be significant. Examples of significant weather are low visibility, high winds, black ice conditions, heavy precipitation that may lead to local flooding, precipitation type (e.g., freezing rain), and/or the like. In various embodiments, a significant weather alert may be based on a single weather parameter or multiple weather parameters. For example, a significant weather alert may include an alert of high winds and an alert of heavy precipitation. In another embodiment, separate alerts may be sent for each significant weather alert. For example, one significant weather alert may be provided for a low visibility alert and another significant weather alert may be provided for a precipitation type alert. In some embodiments, a significant weather alert may be based a combination of various weather parameters. For example, a determination that black ice conditions are likely or are forecasted to be present at a particular location or web section may be based on a combination of the air temperature and a cumulative amount of precipitation received over the past hour, past 6 hours, past day, and/or the like.

FIG. 10 provides a flowchart of providing one or more significant weather alerts for a particular web section 45 (e.g., 45A, 45B, 45C), in accordance with an example embodiment of the present invention. As should be understood, in various embodiments, a significant weather alert for a physical location indicated by a request location information/data may be provided through a similar process. In example embodiments, a process similar to that shown in FIG. 4 may be used to select a weather estimation algorithm for the web section 45 and to estimate one or more weather parameters for the particular web section. In estimating the one or more weather parameters, location information/data representing the location of the centroid of the web section 45 and/or other location within the web section may be used. At block 602, the visibility parameter for the particular web section 45 may be estimated. For example, the estimate apparatus 10 may estimate the visibility parameter for the particular web section 45. For example, the estimate apparatus 10 may comprise means, such as the processor 12, the communication interface 16 or the like, for estimating the visibility parameter for the particular web section 45.

At block 604, it is determined if the visibility parameter is less than a visibility threshold $T_V$. For example, the estimate apparatus 10 may determine if the visibility parameter is less than a visibility threshold $T_V$. For example, the estimate apparatus 10 may comprise means, such as the processor 12 or the like, for determining if the visibility parameter is less than a visibility threshold $T_V$. For example, the visibility threshold $T_V$ may be a visibility of one to four km. If the visibility parameter is less than the visibility threshold $T_V$, then the process continues to block 606. At block 606, a low visibility alert is provided. For example, the estimate apparatus 10 may provide a low visibility alert. For example, the estimate apparatus 10 may comprise means, such as the processor 12, the communication interface 16 or the like, for providing a low visibility alert. For example, the user apparatus 20 may receive the low visibility significant weather alert (e.g., via a communications interface thereof). In various embodiments, the user apparatus 20 may provide and/or display the significant weather alert through a user interface thereof, and/or the like. In example embodiments, the user apparatus 20 may make an audible signal, flash, or otherwise call the user's attention to the significant weather alert. For example, the visibility significant weather alert may indicate the current or forecasted visibility, and/or other information/data that a user may find helpful in dealing with the current and/or forecasted visibility condition.

If, at block 604 it is determined that the visibility parameter is not less than visibility threshold, $T_V$, the process continues to block 608. At block 608, the black ice condition (BIC) parameter is estimated. For example, the estimate apparatus 10 may estimate the BIC parameter for the particular web section 45. For example, the estimate apparatus 10 may comprise means, such as the processor 12, the communication interface 16 or the like, for estimating the BIC parameter for the particular web section 45. The BIC parameter may be a parameter that is estimated based on a combination of other (e.g., measured and/or forecasted) weather parameters. For example, the BIC parameter may indicate the likelihood that black ice is present (or will be present) in and/or around the location for which the BIC parameter is being estimated (e.g., within the particular web section 45). The BIC parameter may be estimated based on estimated air temperature, cumulative precipitation, dew point temperature, wind speed, and/or the like.

At block 610, it is determined if the BIC parameter is greater than a BIC threshold $T_B$. For example, the estimate apparatus 10 may determine if the BIC parameter is greater than a BIC threshold $T_B$. For example, the estimate apparatus 10 may comprise means, such as the processor 12 or the like, for determining if the BIC parameter is greater than a BIC threshold $T_B$. For example, the BIC threshold $T_B$ may be a BIC parameter that indicates that the likelihood of black ice being present is 50%, 75%, 80%, and/or the like. If the BIC parameter is greater than the BIC threshold $T_B$, then the process continues to block 612. At block 612, a black ice alert is provided. For example, the estimate apparatus 10 may provide a black ice alert. For example, the estimate apparatus 10 may comprise means, such as the processor 12, the communication interface 16 or the like, for providing a black ice alert. For example, the user apparatus 20 may receive the black ice significant weather alert (e.g., via a communications interface thereof). In various embodiments, the user apparatus 20 may provide and/or display the significant weather alert through a user interface thereof, and/or the like. In example embodiments, the user apparatus 20 may make an audible signal, flash, or otherwise call the user's attention to the significant weather alert. For example, the black ice significant weather alert may indicate that black ice is likely, tips for dealing with black ice, and/or other information/data that a user may find helpful in dealing with the current and/or forecasted black ice condition.

If at block 610 it is determined that the BIC parameter is not greater than the BIC threshold $T_B$, the process continues to block 614. At block 614, the precipitation intensity (PI) parameter may be estimated. For example, the estimate apparatus 10 may estimate the PI parameter for the particular web section 45. For example, the estimate apparatus 10 may comprise means, such as the processor 12, the communication interface 16 or the like, for estimating the PI parameter for the particular web section 45.

At block 616, it is determined if the PI parameter is greater than a PI threshold $T_P$. For example, the estimate apparatus 10 may determine if the PI parameter is greater than a PI threshold $T_P$. For example, the estimate apparatus 10 may comprise means, such as the processor 12 or the like, for determining if the PI parameter is greater than a PI threshold $T_P$. For example, the PI threshold $T_P$ may be a precipitation intensity of half an inch per hour, an inch per hour, or the like. If the PI parameter is greater than the PI threshold $T_P$, then the process continues to block 618. At block 618, a precipitation intensity significant weather alert is provided. For example, the estimate apparatus 10 may provide a precipitation intensity significant weather alert. For example, the estimate apparatus 10 may comprise means, such as the processor 12, the communication interface 16 or the like, for providing a precipitation intensity significant weather alert. For example, the user apparatus 20 may receive the precipitation intensity significant weather alert (e.g., via a communications interface thereof). In various embodiments, the user apparatus 20 may provide and/or display the significant weather alert through a user interface thereof, and/or the like. In example embodiments, the user apparatus 20 may make an audible signal, flash, or otherwise call the user's attention to the significant weather alert. For example, the precipitation intensity significant weather alert may indicate the precipitation intensity, an area flood advisory/watch, and/or other information/data that a user may find helpful in dealing with the current and/or forecasted precipitation intensity.

If at block 616 it is determined that the PI parameter is not greater than the PI threshold $T_P$, the process continues to block 620. At block 620, the wind speed (WS) parameter may be estimated. For example, the estimate apparatus 10 may estimate the WS parameter for the particular web section 45. For example, the estimate apparatus 10 may comprise means, such as the processor 12, the communication interface 16 or the like, for estimating the WS parameter for the particular web section 45.

At block 622, it is determined if the WS parameter is greater than a wind speed threshold $T_W$. For example, the estimate apparatus 10 may determine if the WS parameter is greater than a WS threshold $T_W$. For example, the estimate apparatus 10 may comprise means, such as the processor 12 or the like, for determining if the WS parameter is greater than a WS threshold $T_W$. For example, the WS threshold $T_W$ may be a sustained wind speed of 5 mph, 10 mph, or the like or a gust speed of 10 mph, 15 mph, 20 mph, or the like. If the WS parameter is greater than the WS threshold $T_W$, then the process continues to block 624. At block 624, a wind speed significant weather alert is provided. For example, the estimate apparatus 10 may provide a wind speed significant weather alert. For example, the estimate apparatus 10 may comprise means, such as the processor 12, the communication interface 16 or the like, for providing a wind speed significant weather alert. For example, the user apparatus 20 may receive the wind speed significant weather alert (e.g., via a communications interface thereof). In various embodiments, the user apparatus 20 may provide and/or display the significant weather alert through a user interface thereof, and/or the like. In example embodiments, the user apparatus 20 may make an audible signal, flash, or otherwise call the user's attention to the significant weather alert. For example, the wind speed significant weather alert may indicate the estimated wind speed (sustained or gusts), a perceived temperature based on the effect of the wind (e.g., wind chill), and/or other information/data that a user may find helpful in dealing with the current and/or forecasted wind condition.

It should be understood that a variety of significant weather alerts may be provided in various embodiments. For example, in one embodiment, a beautiful weather significant weather alert may be provided when the temperature is between 70 and 80° F., the precipitation intensity is 0 inches per hour, and the humidity level is less than 85%. It should be understood that the significant weather alerts discussed herein are provided as non-limiting examples of various significant weather alerts that may be provided in various embodiments.

III. Example Apparatus

The user apparatus 20 and/or estimate apparatus 10 of an example embodiment may be embodied by or associated with a variety of computing devices including, for example, such as a navigation system including an in-vehicle navigation system, a personal navigation device (PND) or a portable navigation device, an advanced driver assistance system (ADAS), a global positioning system (GPS), a cellular telephone, a mobile phone, a smart phone, tablet, laptop, a personal digital assistant (PDA), a watch, a camera, a computer, server, a personal computer, a computer workstation, a laptop computer, a plurality of networked computing devices, and/or other device that can perform functions such as those described elsewhere herein. In this regard, FIG. 2 depicts an apparatus (e.g., an estimate apparatus 10 or a user apparatus 20) of an example embodiment that may be embodied by various computing devices including those identified above. As shown, the apparatus of an example embodiment may include, may be associated with or may otherwise be in communication with a processor 12 and a memory device 14 and optionally a communication interface 16 and/or a user interface 18.

In some embodiments, the processor 12 (and/or co-processors or any other processing circuitry assisting or otherwise associated with the processor) may be in communication with the memory device 14 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the estimate apparatus 10 and/or user apparatus 20 may be embodied by a computing device. However, in some embodiments, the estimate apparatus 10 and/or the user apparatus 20 may be embodied as a chip or chip set. In other words, the estimate apparatus 10 and/or the user apparatus 20 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The estimate apparatus 10 and/or the user apparatus 20 may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the estimate apparatus 10 and/or user apparatus 20 may include a user interface 18 that may, in turn, be in communication with the processor 12 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, and/or the like).

The estimate apparatus 10 and/or the user apparatus 20 may optionally include a communication interface 16. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the estimate apparatus 10 and/or user apparatus 20 of an example embodiment, a navigation system may also include or have access to a geographic database that includes a variety of data (e.g., map information/data) utilized in constructing a route or navigation path and determining the time to traverse the route or navigation path. For example, a geographic database may include node data records (e.g., including anchor node data records comprising junction identifiers), road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In an example embodiment, the road segment data records are links or segments, e.g., maneuvers of a maneuver graph, representing roads, streets, or paths, as can be used in the calculated route or recorded route information for determination of one or more personalized routes. The node data records are end points corresponding to the respective links or segments of the road segment data records. The road link data records and the node data records represent a road network, such as used by vehicles, cars, and/or other entities. Alternatively, the geographic database can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies an apparatus 10 in accordance with an example embodiment may determine the time to traverse a route that includes one or more turns at respective intersections more accurately.

IV. Apparatus, Methods, and Computer Program Products

As described above, FIGS. 5 and 6-10 illustrate flowcharts of an estimate apparatus 10, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14 of an apparatus employing an embodiment of the present invention and executed by the processor 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for providing a weather estimation to a user of a user device, the method comprising:
   receiving, by an apparatus comprising a processor, memory, and communication interface, request location information, wherein the request location information corresponds to a first section of a predetermined web, the predetermined web comprising a plurality of sections each corresponding to a portion of a geographic region;
   identifying, by the apparatus, one or more weather stations and determining one or more distances, each of the one or more distances being a distance from one of the one or more weather stations to a physical location indicated by the request location information;
   responsive to determining that a first distance from a first weather station of the one or more weather stations to the first section is less than a first threshold distance, selecting, by the apparatus, a first weather estimation algorithm, wherein the first weather estimation algorithm determines a weather estimation for the first section based on weather data from a closest weather station to the first section;
   responsive to determining that none of the one or more distances are less than the first threshold distance and at least one of the one or more distances is less than a second threshold distance, selecting, by the apparatus, a second weather estimation algorithm, wherein the second threshold distance is larger than the first threshold distance and the second weather estimation algorithm determines a weather estimation for the first section based on weather data from second weather stations of the one or more weather stations, the second weather stations each located a distance from the first section that is greater than the first threshold distance and less than the second threshold distance;
   responsive to determining that none of the one or more distances are less than the second threshold distance and at least one of the one or more distances is less than a third threshold distance, selecting, by the apparatus, a third weather estimation algorithm, wherein the third threshold distance is larger than the second threshold distance and the third weather estimation algorithm determines the weather estimation for the first section based on (a) weather data from third weather stations of the one or more weather stations, the third weather stations each located a distance from the first section that is greater than the second threshold distance and less than the third threshold distance and (b) corresponding distances between the third weather stations and the first section;
   determining, by the apparatus, the weather estimation for the first section of the predetermined web based at least on a selected one of the first, second, or third weather estimation algorithms and the first section; and
   providing, by the apparatus, the weather estimation to the user device, wherein (a) the user device determined and provided the location information and (b) the user device is configured to display at least a portion of the weather estimation via a user interface of the user device.

2. A method according to claim 1, wherein determining the weather estimation using the first weather estimation algorithm comprises:
   identifying a most recent weather report provided by the closest weather station, and
   assigning a value to one or more weather parameters of the weather estimation based on the most recent weather report.

3. A method according to claim 1, wherein determining the weather estimation using the second weather estimation algorithm comprises:
   identifying one or more most recent weather reports, wherein each of the one or more most recent weather reports was provided by one of the second weather stations, and
   assigning a value to one or more weather parameters of the weather estimation based on an average of corresponding weather parameters from the one or more most recent weather reports.

4. A method according to claim 1, wherein determining the weather estimation using the third weather estimation algorithm comprises:
   identifying one or more most recent weather reports, wherein each of the one or more most recent weather reports was provided by one of the third weather stations, and
   assigning a value to one or more weather parameters of the weather estimation based on a weighted average of corresponding weather parameters from the one or more most recent weather reports.

5. A method according to claim 4 wherein weights used to compute the weighted average are based at least in part on a distance from the third weather station to the physical location, a time since the weather report was issued, or both.

6. A method according to claim 4 wherein weights used to compute the weighted average for a first weather parameter of the one or more weather parameters is based at least in part on the first weather parameter.

7. A method according to claim 1, wherein the method further comprises:
   identifying one or more most recent weather reports, wherein each of the one or more most recent weather reports was provided by one of the one or more weather stations;
   determining if a value assigned to a weather parameter of one of the one or more most recent weather reports is an outlier; and
   when it is determined that a particular value assigned to a particular weather parameter is an outlier, not using the corresponding most recent weather report when assigning a value for the particular weather parameter.

8. A method according to claim 1,
   further comprising determining whether the section is expected to be experiencing significant weather based at least in part on one or more weather parameters of the weather estimation.

9. A method according to claim 8, wherein determining whether the section is expected to be experiencing significant weather comprises determining if a particular weather parameter or a combined parameter determined based on two or more weather parameters is greater than or less than a corresponding threshold parameter.

10. A method according to claim 1, wherein the weather estimation is for current weather conditions, forecasted weather conditions, or both.

11. A method according to claim 1 wherein the request location information is determined by a user computing device and indicates the current physical location of a user.

12. A method according to claim 1 wherein at least one of the one or more weather stations has a fixed location, at least one of the one or more weather stations has a non-fixed location, or both.

13. An apparatus comprising at least one processor and at least one memory storing computer program code, the at least one memory and the computer program code configured to, with the processor, cause the apparatus to at least:
  receive request location information, wherein the request location information corresponds to a first section of a predetermined web, the predetermined web comprising a plurality of sections each corresponding to a portion of a geographic region;
  identify one or more weather stations and determine one or more distances, each of the one or more distances being a distance from one of the one or more weather stations to a physical location indicated by the request location information;
  responsive to determining that a first distance from a first weather station of the one or more weather stations to the first section is less than a first threshold distance, select a first weather estimation algorithm, wherein the first weather estimation algorithm determines a weather estimation for the first section based on weather data from a closest weather station to the first section;
  responsive to determining that none of the one or more distances are less than the first threshold distance and at least one of the one or more distances is less than a second threshold distance, select a second weather estimation algorithm, wherein the second threshold distance is larger than the first threshold distance and the second weather estimation algorithm determines a weather estimation for the first section based on weather data from second weather stations of the one or more weather stations, the second weather stations each located a distance from the first section that is greater than the first threshold distance and less than the second threshold distance;
  responsive to determining that none of the one or more distances are less than the second threshold distance and at least one of the one or more distances is less than a third threshold distance, select a third weather estimation algorithm, wherein the third threshold distance is larger than the second threshold distance and the third weather estimation algorithm determines the weather estimation for the first section based on (a) weather data from third weather stations of the one or more weather stations, the third weather stations each located a distance from the first section that is greater than the second threshold distance and less than the third threshold distance and (b) corresponding distances between the third weather stations and the first section;
  determine a weather estimation for the first section of the predetermined web based at least on a selected one of the first, second, or third weather estimation algorithms and the first section; and
  provide the weather estimation to a user device, wherein (a) the user device determined and provided the location information and (b) the user device is configured to display at least a portion of the weather estimation via a user interface of the user device.

14. An apparatus according to claim 13, wherein
  to determine the weather estimation using the first weather estimation algorithm, the at least one memory and the computer program code are configured to, with the processor, cause the apparatus to at least:
  identify a most recent weather report provided by the first weather station, and
  assign a value to one or more weather parameters of the weather estimation based on the most recent weather report.

15. An apparatus according to claim 13, wherein
  to determine the weather estimation using the second weather estimation algorithm, the at least one memory and the computer program code are configured to, with the processor, cause the apparatus to at least:
  identify one or more most recent weather reports, wherein each of the one or more most recent weather reports was provided by one of the one or more second weather stations, and
  assign a value to one or more weather parameters of the weather estimation based on an average of corresponding weather parameters from the one or more most recent weather reports.

16. An apparatus according to claim 13, wherein
  to determine the weather estimation using the third weather estimation algorithm the at least one memory and the computer program code are configured to, with the processor, cause the apparatus to at least:
  identify one or more most recent weather reports, wherein each of the one or more most recent weather reports was provided by one of the one or more third weather stations, and
  assign a value to one or more weather parameters of the weather estimation based on a weighted average of corresponding weather parameters from the one or more most recent weather reports.

17. An apparatus according to claim 16, wherein weights used to compute the weighted average are based at least in part on a distance from the third weather station to the physical location, a time since the weather report was issued, or both.

18. An apparatus according to claim 13, wherein the at least one memory and the computer program code are configured to, with the processor, cause the apparatus to at least:
  identify one or more most recent weather reports, wherein each of the one or more most recent weather reports was provided by one of the one or more weather stations;
  determine if a value assigned to a weather parameter of one of the one or more most recent weather reports is an outlier; and
  when it is determined that a particular value assigned to a particular weather parameter is an outlier, not use the corresponding most recent weather report when assigning a value for the particular weather parameter.

19. A computer program product comprising at least one non-transitory computer-readable storage medium having computer-executable program code instructions stored therein, the computer-executable program code instructions comprising program code instructions configured to:
  receive request location information, wherein the request location information corresponds to a first section of a predetermined web, the predetermined web comprising a plurality of sections each corresponding to a portion of a geographic region;
  identify one or more weather stations and determine one or more distances, each of the one or more distances being a distance from one of the one or more weather stations to a physical location indicated by the request location information;
  responsive to determining that a first distance from a first weather station of the one or more weather stations to the first section is less than a first threshold distance, select a first weather estimation algorithm, wherein the first weather estimation algorithm determines a weather estimation for the first section based on weather data from a closest weather station to the first section;

responsive to determining that none of the one or more distances are less than the first threshold distance and at least one of the one or more distances is less than a second threshold distance, select a second weather estimation algorithm, wherein the second threshold distance is larger than the first threshold distance and the second weather estimation algorithm determines a weather estimation for the first section based on weather data from second weather stations of the one or more weather stations, the second weather stations each located a distance from the first section that is greater than the first threshold distance and less than the second threshold distance;

responsive to determining that none of the one or more distances are less than the second threshold distance and at least one of the one or more distances is less than a third threshold distance, select a third weather estimation algorithm, wherein the third threshold distance is larger than the second threshold distance and the third weather estimation algorithm determines the weather estimation for the first section based on (a) weather data from third weather stations of the one or more weather stations, the third weather stations each located a distance from the first section that is greater than the second threshold distance and less than the third threshold distance and (b) corresponding distances between the third weather stations and the first section;

determine a weather estimation for the first section of the predetermined web based at least on the weather estimation algorithm and the first section; and provide the weather estimation to a user device, wherein (a) the user device determined and provided the location information and (b) the user device is configured to display at least a portion of the weather estimation via a user interface of the user device.

* * * * *